United States Patent [19]

Nomura

[11] Patent Number: 5,404,182
[45] Date of Patent: Apr. 4, 1995

[54] SWIVEL CHASSIS

[75] Inventor: Atsushi Nomura, Sakado, Japan

[73] Assignee: Nippon Control Industrial Co., Ltd., Saitama, Japan

[21] Appl. No.: 173,063

[22] Filed: Dec. 27, 1993

[30] Foreign Application Priority Data

Oct. 28, 1993 [JP] Japan .................... 5-294187

[51] Int. Cl.6 .................... G03B 17/00; A47B 5/00
[52] U.S. Cl. .................... 348/836; 348/827; 348/838; 312/7.2; 354/293; 248/920; 248/923
[58] Field of Search .............. 348/836, 787, 789, 838, 348/827; 312/7.2; 354/293; 248/920, 923; 455/347, 348, 349

[56] References Cited

U.S. PATENT DOCUMENTS

| | | | |
|---|---|---|---|
| 4,554,590 | 11/1985 | Chelin et al. | 348/836 |
| 4,579,436 | 4/1986 | Jaumann | 354/293 |
| 4,653,709 | 3/1987 | Paldino | 354/293 |
| 4,880,191 | 11/1989 | Lake, Jr. | 248/923 |
| 4,959,671 | 9/1990 | Ishikawa | 354/293 |
| 5,024,415 | 6/1991 | Purens | 248/923 |
| 5,145,134 | 9/1992 | Hashimoto et al. | 248/923 |
| 5,209,446 | 5/1993 | Kawai | 248/923 |

*Primary Examiner*—Edward L. Coles, Sr.
*Assistant Examiner*—Kimberly A. Williams
*Attorney, Agent, or Firm*—Wenderoth, Lind & Ponack

[57] ABSTRACT

The objective of the present invention is to provide a swivel chassis in which the angle of the mounted device can be freely varied vertically and horizontally and in which a sufficient level of holding strength is assured so that the desired angle is not subject to change with vibration and the weight of the mounted device. To achieve this objective, the swivel chassis main unit comprises a base and a hemispherical raised portion with spherical surfaces formed on the inside and outside, and an inclination restricting hole formed at its center.

20 Claims, 6 Drawing Sheets

SWIVEL CHASSIS

BACKGROUND OF THE INVENTION

1. Field of the Invention

The present invention relates to a swivel chassis for varying the mounting angle of devices such as motion picture cameras.

2. Related Art

One prior art swivel chassis for varying the mounting angle of motion picture cameras and the like comprises a stand provided with two inverted triangular legs and a base provided with two triangular legs, arranged one on top of the other so that the tips of the legs overlap. The legs connect with each other where they overlap with grooved connecting disks which engage each other to form a pivot point. Then, with support provided by the mounting bolt, the stand is made rotatable (refer to Japanese Unexamined Patent Publication 3-56261).

Another prior art arrangement has holes provided in a bottom panel of a motion picture camera on the lens side, wherein leg sections are provided so that they can emerge through these holes. By adjusting the length of the leg sections extending out of the holes, it is possible to vary the mounting angle of the motion picture camera (refer to Japanese Unexamined Patent Publication 3-20331).

However, of the two examples, quoted above, in the structure of the first swivel chassis, because the stand turns around the mounting bolt as the center of rotation, the mounting angle of the device can be varied vertically but it is not possible to change the angle horizontally. Also, with the support being provided by the mounting bolt, contact is achieved only on the bolt. Therefore, the contact area is small, resulting in limited contact resistance. This means that the holding strength of the mounting angle is limited and the angle can easily change due to vibration or the weight of the mounted device. In order to prevent this, the mounting bolt has to be tightened with considerable force, making it very inconvenient to change the mounting angle.

In the second example above, the structure of the swivel chassis makes it possible to change mounting angles only above the horizon. Also, there is the inconvenience that in order to change the photographing direction of the motion picture camera, it is necessary to change the position of the motion picture camera itself. Furthermore, if a standard motion picture camera is used, it is necessary to modify the camera at extra expense.

SUMMARY OF THE INVENTION

The objective of the present invention is to provide a swivel chassis in which the angle of the mounted device can be varied easily and freely in both the vertical plane and the horizontal plane and which has sufficient holding strength to assure that the desired angle is not subject to change due to vibration or the weight of the device.

The swivel chassis of the present invention may be summarized as follows. The invention comprises a swivel chassis main unit that is provided with a hemispherical raised portion with spherical surfaces on the inside and outside and an inclination restricting hole formed at the center; a globe cover that is provided with an upper surface that will be in contact with the mounted device, an internal spherical surface that is in contact with the spherical surface on the outside of the swivel chassis main unit and a cylindrical column section provided along the direction of the axial diameter of the internal spherical surface with a through hole formed in the cylindrical column; a hemispherical globe joint that is located adjacent to the spherical surface on the inside of the swivel chassis main unit across an elastic material and that is provided with a fitting hole that accepts the cylindrical column section of the globe cover and is concentric with the through hole in the column section; and a helical element that connects with the mounted device by screwing to clamp the swivel chassis main unit, globe cover and globe joint together with the mounted device.

With this structure, if a force is applied to the device mounted on the swivel chassis in the desired direction, the globe cover and globe joint are swiveled along the spherical surface of the hemispherical raised portion of the swivel chassis main unit. This movement will be made possible by the elasticity of the elastic material and in resistance to the clamping strength of the globe cover and the globe joint. The application of force causes the elastic material to deform, and resistance is relatively light so that the swiveling operation can be performed easily. In addition, the spherical surface of the globe cover and the spherical surface on the outside of the hemispherical raised portion of the swivel chassis main unit are in surface contact over a large area and the globe joint is in contact with the elastic material over its entire circumference so again the contact surface covers a large area. Consequently, the mounting angle can be reliably maintained.

DETAILED DESCRIPTION OF THE PREFERRED EMBODIMENT

The following is a description of an embodiment of the present invention with reference to the drawings.

Figure 1:
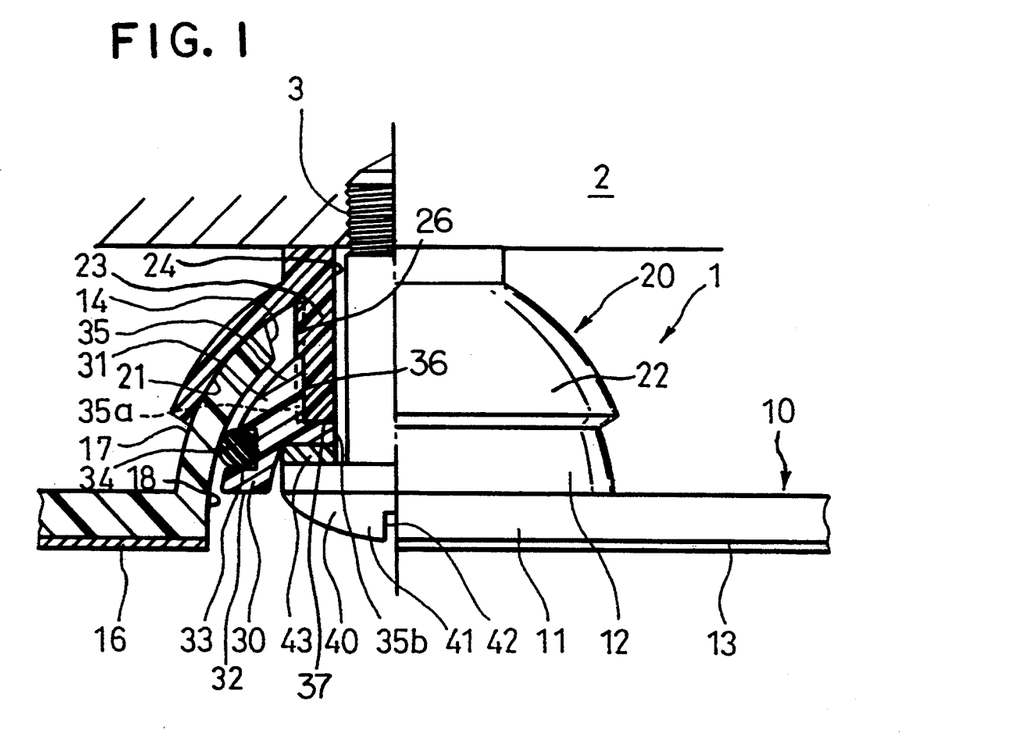
FIG. 1 is a partial cross section showing the overall structure of a swivel chassis according to the present invention when it is in a horizontal state.
Figure 6:
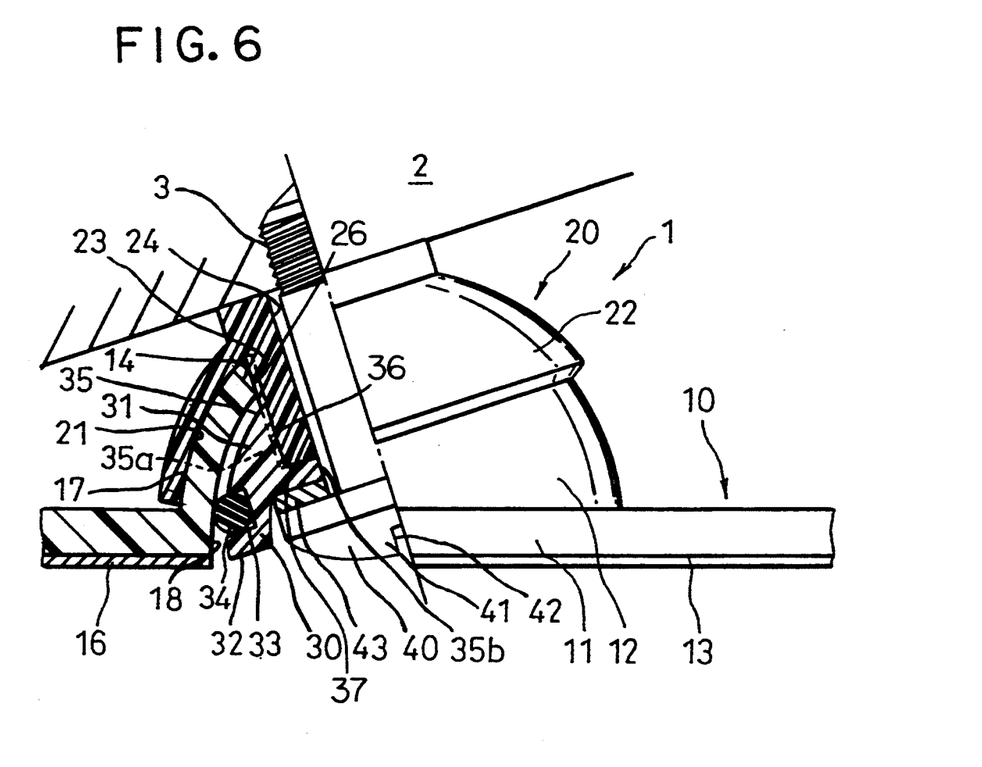
FIG. 6 is a partial cross section showing the overall structure of the swivel chassis according to the present invention when it is in a tilted state.
Figure 7:
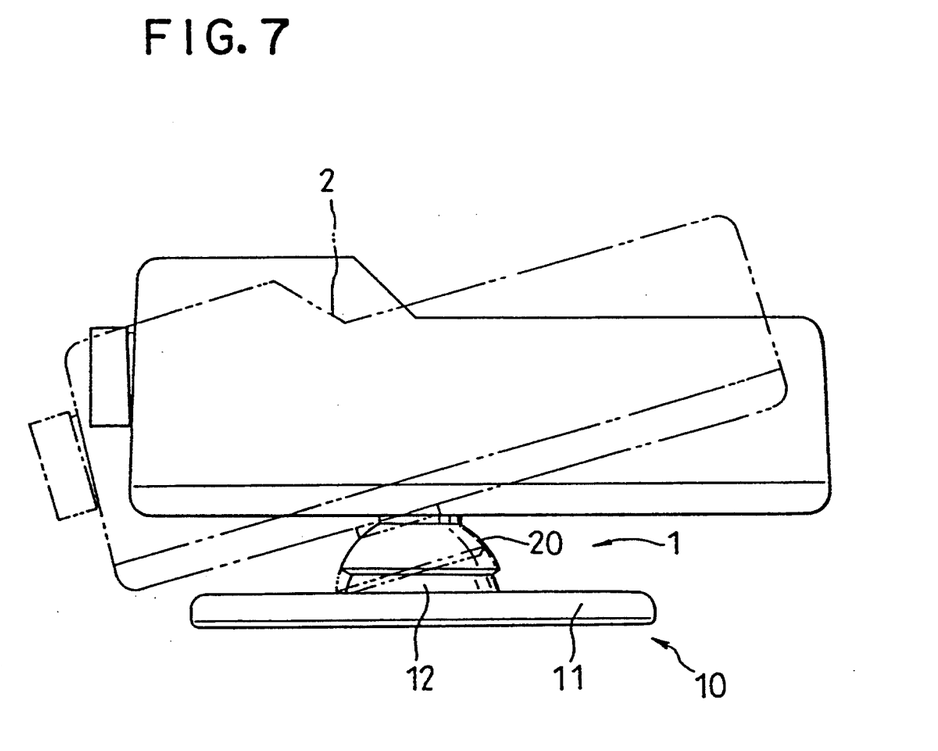
FIG. 7 illustrates a motion picture camera mounted on the swivel chassis according to the present invention.

As shown in FIGS. 1 and 6, the swivel chassis 1 according to the present invention is basically structured with a swivel chassis main unit 10, a globe cover 20, an upwardly convex globe joint 30 and an elongated helical (or threaded) element 40. As shown in FIG. 7, it can be mounted on a table, television set or the like, such that a mounted (or mountable) device 2 such as a video camera can be mounted thereon.

Figure 3:
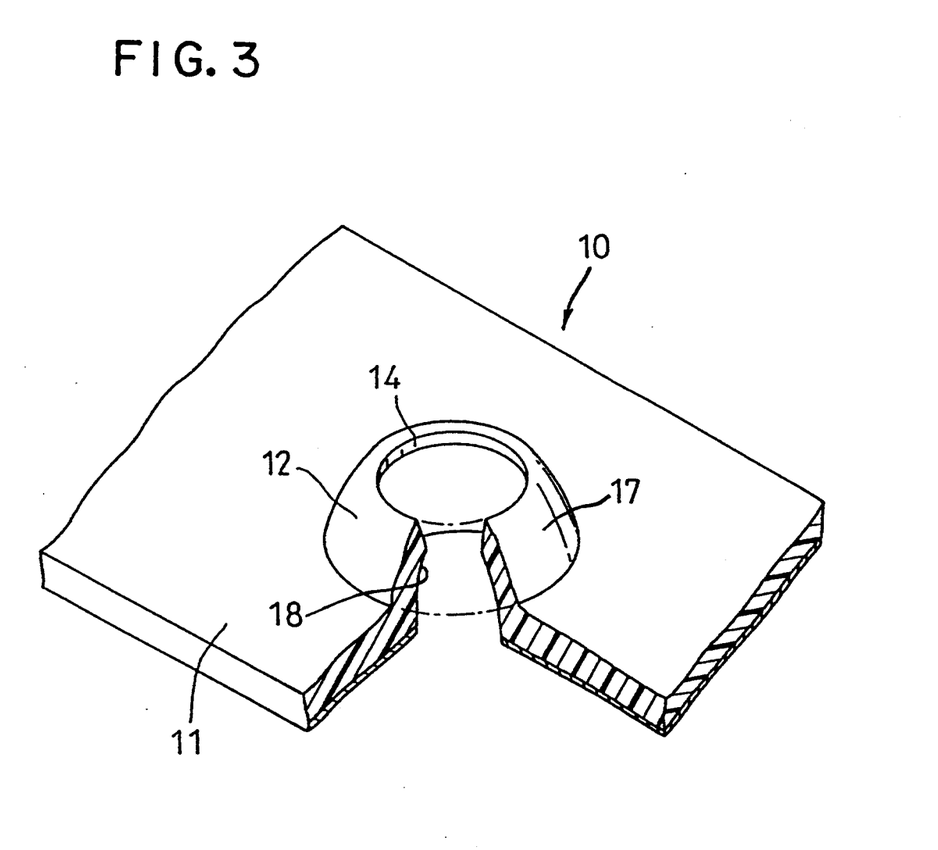
FIG. 3 is a partially cut away perspective view of the swivel chassis main unit of the swivel chassis illustrated in FIG. 1.

The swivel chassis main unit 10, as shown in FIGS. 1 and 3, consists of a base 11 that is provided with a flat, rectangular mounting surface 13 on the bottom and an upwardly convex hemispherical raised portion 12 which has the appearance of an inverted cup formed at the approximate center of the base 11.

The hemispherical raised portion 12 is provided with an internal spherical surface 18 and an external spherical surface 17 of specific radii on the inside and outside, respectively. The external spherical surface 17 is in contact with an internal spherical surface 21 of the globe cover 20, to be explained later. The internal spherical surface 18 is in contact with the globe joint 30, to be explained later. Both external and internal spherical surfaces 17 and 18 are formed so that they swivel easily.

The hemispherical raised portion 12 is provided with an inclination restricting hole 14 formed at its center that goes through to the cavity formed on the inside of the hemispherical raised portion 12. The diameter of this inclination restricting hole 14, is larger than the diameter of a cylindrical column section 23 of the globe cover 20 that is to be explained later. This diameter determines the maximum swivel angle of the mounted device 2. The opening of the inclination restricting hole 14 is a contact edge with which the cylindrical column section 23 comes in contact.

Furthermore, the mounting surface 13 is provided with a means of adhesion 16 such as Velcro, double sided tape or the like, as shown in FIG. 1, so that the swivel chassis 1 can be secured on to a table, television set or the like. However, this means of adhesion 16 may not be required when the device 2 is to be placed only temporarily on a table, television set or the like.

Figure 4:
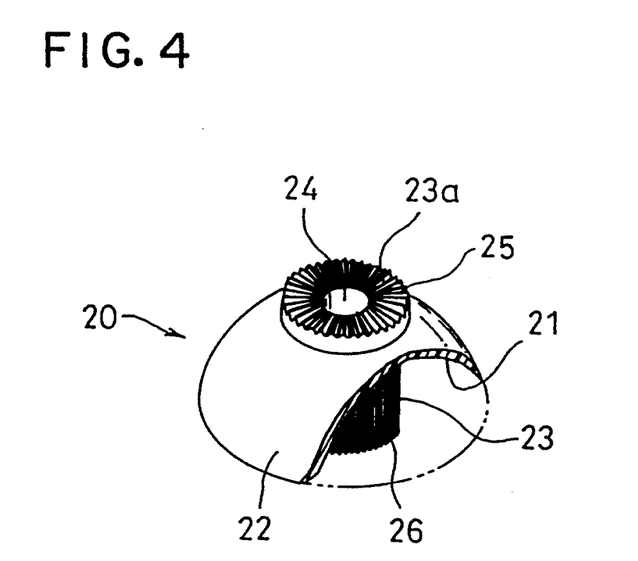
FIG. 4 is a partially cut away perspective view of the globe cover of the swivel chassis illustrated in FIG. 1.

The globe cover 20, as shown in FIGS. 1 and 4, comprises a downwardly concave sliding section 22 which is provided with the internal spherical surface 21 that comes in contact with the external spherical surface 17 of the hemispherical raised portion 12 of the swivel chassis main unit 10, and the cylindrical column section 23 which is provided in the vertical direction in relation to the sliding section 22. The internal spherical surface 21 can easily slide against the external spherical surface 17 formed on the aforementioned hemispherical raised portion 12.

The cylindrical column section 23 is located at the center of the cup-like sliding section 22 and it projects vertically through the cup-like sliding section 22, with the projection on the side of the internal spherical surface 21 being more extended. The diameter of the column section 23 is larger outside the globe cover 20 than inside the globe cover 20, but the invention is not limited to this structure. The end of cylindrical column section 23 outside the globe cover 20 is provided with a contact surface 23a which comes in contact with the mounted device 2 and has rotation lock grooves 25 formed therein to prevent rotation of the mounted device 2. At the same time, the cylindrical column section 23 is provided with a through hole 24 along the cylinder axis. Inside the globe cover 20, the column section 23 is provided with axially extending minute engaging teeth 26 on its outer circumferential surface.

The globe joint 30, shown in FIGS. 1, 2, 5 and 6, is hemispherical and is provided with an upper spherical surface 31 and a lower non-spherical surface (bottom surface) 32. This spherical surface 31 faces the internal spherical surface 18 of the hemispherical raised portion 12 and has the same radius as that of the spherical surface 18. An annular groove 33 is formed at a location close to the bottom surface 32 on the spherical surface 31 and an O-ring 34, made of an elastic material such as rubber, is housed within the annular groove 33. The O-ring 34, while housed within the annular groove 33 as described above, is also in contact with the internal spherical surface 18 of the aforementioned hemispherical raised portion 12. With this structure, there is a gap of approximately 1 mm maintained between the spherical surface 31 and the internal spherical surface 18 of the hemispherical raised portion 12. Also, in order to minimize contact resistance with the spherical surface 18, the O-ring 34 is provided with a lubricating agent such as silicon oil to minimize the swiveling force required.

Figure 5:
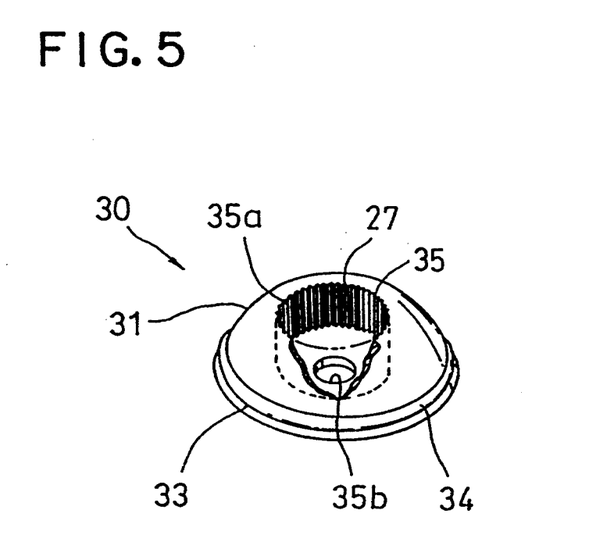
FIG. 5 is a partially cut away perspective view of the globe cover of the swivel chassis illustrated in FIG. 1.

The globe joint 30, as shown in FIG. 5, is provided with a fitting hole 35 that consists of two concentric sections; a large diameter section 35a and a small diameter section 35b. A support surface 37 is thus formed about the small diameter section 35b at the bottom end of the large diameter section 35a. The large diameter section 35a opens through the external spherical surface 31 and has exactly the same diameter as the aforementioned cylindrical column section 23, provided inside the globe cover 20. The internal surface of the large diameter section 35a is provided with an area of engaging teeth 36 that engage with the engaging teeth 26 on the surface of the cylindrical column section 23. The engaging teeth 26 and 27 constitute a means of connection in the form of a longitudinal spline connection.

The small diameter section 35b of the aforementioned fitting hole 35 opens through the bottom side of the globe joints 30 and is aligned with the through hole 24 of the cylindrical column section 23 which is fitted inside the large diameter section 35a of the aforementioned fitting hole 35 to constitute an insertion hole for the helical element 40, which is to be explained later.

Figure 2:
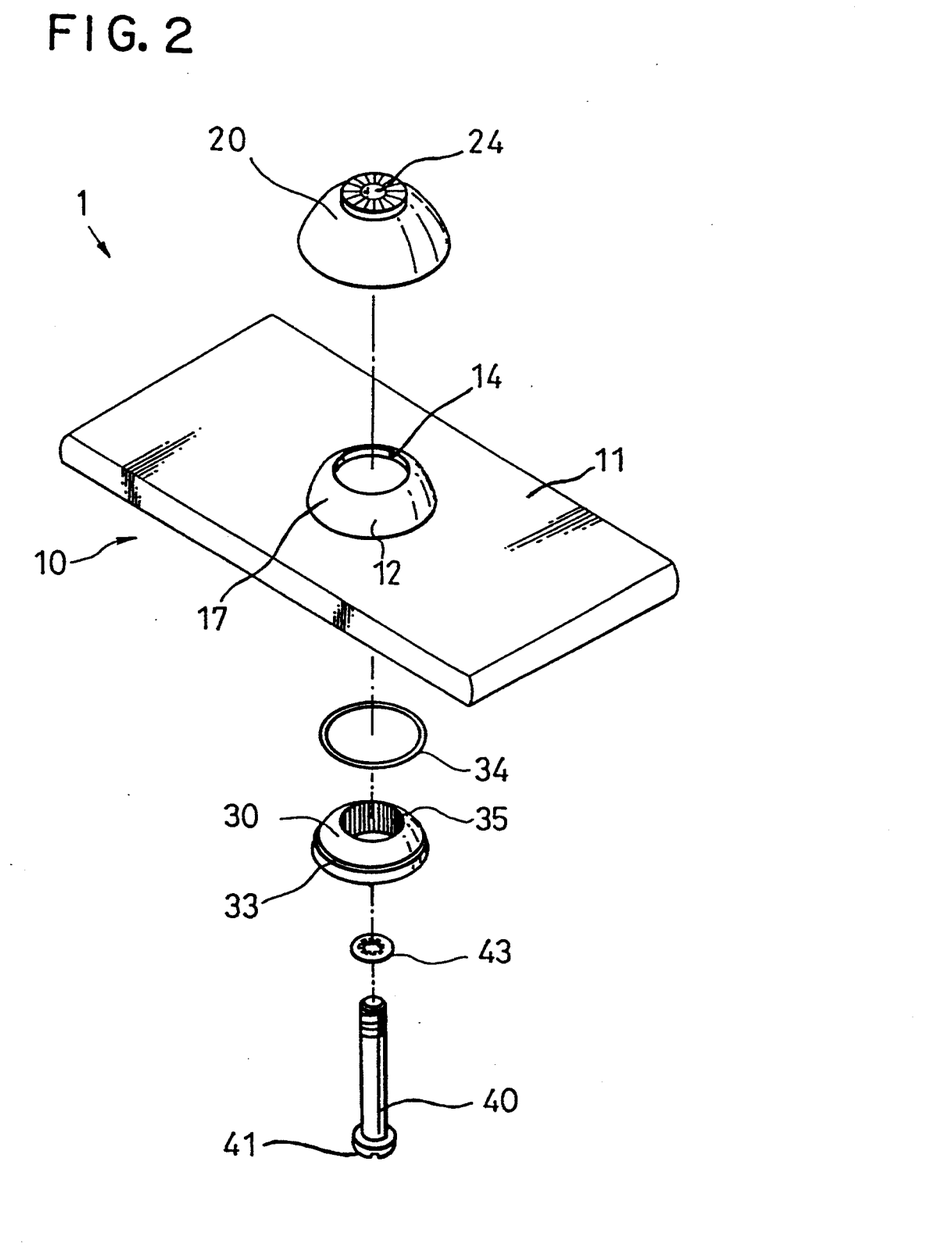
FIG. 2 illustrates a procedure for mounting a globe cover, globe joint and helical element onto a swivel chassis main unit to form the swivel chassis illustrated in FIG. 1.

As shown in FIGS. 1 and 2, the helical element 40 has only its tip cut helically (i.e. provided with threads), and the entire element 40 is longer than the combined length of the through hole 24 of the globe cover 20 and the small diameter section 35b of the fitting hole 35 of the globe joint 30 in their axial directions and has the same diameter as the mounting helical element for international standard tripods. This means that the helical element can be used with any camera compatible with international standard tripods.

Also, a groove 42 formed at the top section 41 of the helical element 40 is wider than a regular screw-driver groove. Because of this, a mounted device 2 can be tightened onto the swivel chassis 1 by turning the helical element 40 with some handy metal object of indeterminate thickness such as a key or a coin.

The helical element 40 has a head section 41, and a locking washer 43 with inwardly directed tabs for locking against rotation is fitted about the helical element 40 against the head 41, as shown in FIGS. 1 and 2.

Next, the mounting procedure for the swivel chassis 1 which, as described above, essentially comprises the globe cover 20, the swivel chassis main unit 10, the globe joint 30 and the helical element 40, will be described with reference to FIG. 2.

First, mount the washer 43 on the helical element 40 and insert the O-ring 34 into the annular groove 33 of the globe joint 30. Pass the helical element 40 through the fitting hole 35 of the globe joint 30 until its head 41 comes in contact with the bottom of the joint. Then insert the globe joint 30 from below the swivel chassis main unit 10 so that it fits into the hemispherical raised portion 12. Next, insert the cylindrical column section 23 of the globe cover 20 into the inclination restricting hole 14 of the hemispherical raised portion 12 of the swivel chassis main unit 10 so that it may be fitted into the fitting hole 35 of the globe joint 30 until it comes in contact with the support surface 37. At this point, the engaging teeth 26 are engaged with the engaging teeth 36.

With this, the swivel chassis 1 is in place, and, as the helical element 40 extends slightly beyond the contact surface 23a of the globe cover 20, it can be fitted into the helical (or threaded) hole 3 of the mounted device 2 and secured by screwing it in. At this point, by tightening up the globe cover 20, the swivel chassis main unit 10 and the globe joint 30, the mounted device 2 is locked on to the swivel chassis 1.

In summary, the swivel chassis 1, which is assembled by following the above procedure, has the structure shown in FIGS. 1 and 7. That is, the spherical surface 31 of the globe joint 30 is in contact with the internal spherical surface 18 of the hemispherical raised portion 12 of the swivel chassis main unit 10 by way of the O-ring 34, the cylindrical column section 23 of the globe cover 20 is fitted into the fitting hole 35 of the globe joint 30 and at the same time the internal spherical surface 21 of the globe cover 20 is in contact with the external spherical surface 17 of the hemispherical raised portion of the swivel chassis main unit 10.

With the helical element 40, the globe joint 30 and the cylindrical column section 23 of the globe cover 20 thus tightened by the helical element, the globe cover 20, the globe joint 30 and mounted device 2 move as a unit.

Furthermore, as the swivel chassis main unit 10 is secured to the table or television set by means of adhesion means 16, it does not move. The mounted device 2 and globe cover 20 are prevented from fee movement by the rotation locking grooves 25 formed on the contact surface 23a. Also, since the globe cover 20 and joint 30 are connected with each other by the engaging teeth 26 formed on the outer circumference of the cylindrical column section 23 and the engaging teeth 36 formed in the fitting hole 35, the globe cover 20 and globe joint 30 are prevented from rotating freely.

With this structure, the sliding surface 22 of the globe cover 20 can slide completely freely on the hemispherical raised portion 12 of the swivel chassis main unit 10 both horizontally and vertically until the cylindrical column section 23 comes in contact with the inclination restricting hole 14 of the swivel chassis main unit 10 as shown in FIG. 6. At the same time, with the friction of the O-ring 36, the inclination angle can be maintained. Because of this, the mounted device 2 and the globe cover 20 incline at the same time, such that the mounting angle of the mounted device 2 can be varied in any direction as shown in FIG. 7 and the mounting angle can be reliably maintained.

In addition, by rotating the globe cover 20, the mounted device 2 is also rotated in the same direction because the rotation movement is communicated through the globe joint 30, the helical element 40 and also directly through the cylindrical column section 23. This means the direction of the mounted device 2 can also be freely varied.

Furthermore, if the helical hole 3 that will accommodate the helical element 40 is present in the bottom section of the mounted device 2, this swivel chassis can be used without requiring any changes to the mounted device itself.

As has been explained thus far, according to the present invention, by applying force in the desired direction when holding the device mounted on the swivel chassis, the globe cover can be tilted freely in any direction along the spherical surface of the hemispherical raised portion of the swivel chassis main unit until it comes in contact with the inclination restricting hole of the swivel chassis main unit and also, as the globe cover can be rotated along the spherical surface of the hemispherical raised portion of the swivel chassis main unit around the helical element, the mounting angle and mounting direction of the mounted device which moves with the globe cover and globe joint as a unit, can be changed freely. During such motion, because of the means of connection, the globe joint and globe cover do not rotate independently. Likewise, the device itself and globe cover also do not rotate independently because of the rotation locking grooves.

Also, as the contact between the globe cover and the swivel chassis main unit is a surface contact over a large area of the hemispherical surfaces and also as the external spherical surface of the globe joint and the spherical surface on the inside of the hemispherical raised portion of the swivel chassis main unit are in contact with each other with the contact surface of one being the entire circumference of the elastic material and that of the other being the hemispherical surface, again the contact surface is large, and it is possible, therefore, to maintain the mounting angle of the device reliably.

Furthermore, the swiveling motion of the device is made against the clamping force of the globe cover and globe joint upon the elasticity of the O-ring. By applying force, the O-ring becomes deformed and by applying silicon oil to the O-ring, the swiveling operation can be performed with a relatively light touch.

What is claimed is:

1. A swivel chassis comprising:
   a swivel chassis main unit including a hemispherical raised portion having an inner spherical surface, an outer spherical surface, and an inclination restricting hole formed through said inner and outer spherical surfaces;
   a globe cover having a sliding section with an inner spherical surface mounted in sliding contact with said outer spherical surface of said hemispherical raised portion, and a cylindrical column section attached to said sliding section and having a first end, a second end and an axial through hole, said first end being located outwardly of said sliding section and forming a contacting surface;
   a hemispherical globe joint mounted adjacent said inner spherical surface of said hemispherical raised portion, said hemispherical globe joint having a fitting hole formed therein, said second end of said cylindrical column section of said globe cover being disposed in said fitting hole such that said fitting hole is concentric with said through hole of said cylindrical column section of said globe cover;
   an elastic material interposed between said hemispherical globe joint and said globe cover; and
   an elongated element having first and second ends and extending through said fitting hole of said hemispherical globe joint and said through hole of said cylindrical column section of said globe cover such that said first end of said elongated element extends outwardly of said first end of said cylindrical column section of said globe cover, helical threads being formed at said first end of said elongated element.

2. A swivel chassis as recited in claim 1, wherein said elongated element constitutes means for clamping said hemispherical raised portion of said swivel chassis main unit between said hemispherical globe joint and said sliding section of said globe cover so as to prevent relative movement between said globe cover and said raised portion of said swivel chassis main unit.

3. A swivel chassis as recited in claim 2, wherein said elongated element further constitutes means for mounting said swivel chassis main unit, said globe cover and said hemispherical globe joint to a device having a threaded hole formed therein.

4. A swivel chassis as recited in claim 1, wherein said hemispherical raised portion of said swivel chassis main unit is upwardly convex.

5. A swivel chassis as recited in claim 1, wherein a portion of said cylindrical column section of said globe cover extends through said inclination restricting hole of said hemispherical raised portion of said swivel chassis main unit and has an outside diameter smaller than an inside diameter of said inclination restricting hole.

6. A swivel chassis as recited in claim 1, wherein an annular groove is formed in an outer surface of said hemispherical globe joint; and said elastic material comprises an O-ring mounted in said annular groove and contacting said inner spherical surface of said hemispherical raised portion of said swivel chassis main unit.

7. A swivel chassis as recited in claim 6, wherein silicon oil is provided on said elastic material.

8. A swivel chassis as recited in claim 1, wherein silicon oil is provided on said elastic material.

9. A swivel chassis as recited in claim 1, wherein said second end of said cylindrical column section of said globe cover is connected to said fitting hole of said hemispherical globe joint.

10. A swivel chassis as recited in claim 1, wherein first engaging teeth are provided in said fitting hole of said hemispherical globe joint;
second engaging teeth are provided on said cylindrical column section of said globe cover; and
said first teeth are engaged with said second teeth.

11. A swivel chassis as recited in claim 10, wherein said first and second teeth constitute a longitudinal spline connection; and
said globe cover and said hemispherical globe joint are fixed against rotation relative to one another.

12. A swivel chassis as recited in claim 1, wherein said fitting hole of said hemispherical globe joint comprises a large diameter section and a small diameter section adjoining said large diameter section, such that a support surface is formed at a junction between said large and small diameter sections of said fitting hole.

13. A swivel chassis comprising:
a swivel chassis main unit including an upwardly convex raised portion having an inner spherical surface, an outer spherical surface, and an inclination restricting hole formed through said inner and outer spherical surfaces;
a globe cover having a downwardly concave sliding section with an inner spherical surface mounted in sliding contact with said outer spherical surface of said raised portion, and a column section attached to said sliding section and extending through said inclination restricting hole of said raised portion such that one end of said column section is disposed on an interior side of said raised portion, said column section having an axial through hole;
an upwardly convex globe joint mounted adjacent said inner spherical surface of said raised portion, said globe joint having a fitting hole formed therein, and said one end of said column section of said globe cover being disposed in said fitting hole such that said fitting hole is concentric with said through hole of said column section of said globe cover; and
an elongated element extending through said fitting hole of said globe joint and said through hole of said column section of said globe cover and constituting a means for selectively clamping said raised portion between said globe joint and said sliding section of said globe cover.

14. A swivel chassis as recited in claim 13, wherein said fitting hole of said globe joint comprises a large diameter section and a small diameter section adjoining said large diameter section, such that a support surface is formed at a junction between said large and small diameter sections of said fitting hole.

15. A swivel chassis as recited in claim 14, wherein said column section of said globe cover is connected in said large diameter section of said fitting hole of said globe joint such that said globe cover and said globe joint are fixed against rotation relative to one another.

16. A swivel chassis as recited in claim 15, wherein an elastic material is interposed between said globe joint and said globe cover.

17. A swivel chassis as recited in claim 16, wherein said elongated element comprises a threaded element having threads formed at least at one end thereof, said threaded element extending through said large and small diameter sections of said fitting hole of said globe joint and through said through hole of said column section of said globe cover, such that said one end of said threaded element extends outwardly of said globe cover on an exterior side thereof.

18. A swivel chassis as recited in claim 17, wherein said one end of said threaded element further constitutes a means for engaging in a threaded hole in a bottom surface of a mountable device; and
said swivel chassis main unit further comprises a base having a mounting surface and being attached beneath said raised portion.

19. A swivel chassis as recited in claim 13, wherein said elongated element comprises a threaded element having threads formed at least at one end thereof, said threaded element extending through said large and small diameter sections of said fitting hole of said globe joint and through said through hole of said column section of said globe cover, such that said one end of said threaded element extends outwardly of said globe cover on an exterior side thereof.

20. A swivel chassis as recited in claim 19, wherein said one end of said threaded element further constitutes a means for engaging in a threaded hole in a bottom surface of a mountable device; and
said swivel chassis main unit further comprises a base having a mounting surface and being attached beneath said raised portion.

* * * * *